Sept. 5, 1933. A. A. WILLIAMS Re. 18,932

ARMORED SHOE

Original Filed Nov. 19, 1929

Inventor:
Arthur A. Williams,
by Arthur C. Randall
Atty.

Reissued Sept. 5, 1933

Re. 18,932

UNITED STATES PATENT OFFICE 18,932

ARMORED SHOE

Arthur A. Williams, Holliston, Mass.

Original No. 1,823,924, dated September 22, 1931, Serial No. 408,223, November 19, 1929. Application for reissue March 28, 1933. Serial No. 663,199

7 Claims. (Cl. 36—77)

My invention relates to boots and shoes, and particularly to armored boots and shoes for workmen.

The object of this invention is to provide an improved armored boot or shoe especially designed for use by foundry men, machinists and the like, and which will protect the feet from injury by falling castings or other heavy objects.

Workmen in foundries, machine shops and like places who wear unarmored shoes of ordinary construction frequently have their foot crushed or otherwise injured by heavy castings or the like falling thereon, and sometimes the injury is such that it is necessary to cut the shoe away from the foot.

My invention provides a boot or shoe having the attractive exterior appearance of an ordinary boot or shoe but which has incorporated in the toe portion thereof a metallic box made from heavy gauge sheet metal moulded to conform to the shape of the toe portion of the boot or shoe within which latter it is completely embedded and held or pocketed in such manner that, in the event that the metallic box is crushed down into the foot of the wearer so as to prevent withdrawal of the foot from the shoe in the ordinary manner, said metallic box can be readily removed from the shoe structure by merely slitting the toe portion of upper that is outside of the metallic box, thereby freeing the latter so that it can be lifted out of place thus freeing the foot.

In the best form of my invention the heavy gauge sheet metal box is made from steel and is hardened and tempered so as to withstand great crushing pressures without distortion.

The metal boxes of shoes made by me, in accordance with this invention withstand a pressure of over five thousand pounds. It will thus be apparent that my invention does not consist in merely constructing the toe of a shoe or the like with a sheet metal toe box, but in providing the same with a shield for the toes of the wearer which will withstand great pressures tending to crush the same, which cannot normally be crushed so as to clamp the toes within it, and which can be quickly removed from the shoes to permit removal of the foot in the event that it is displaced or distorted sufficiently to clamp the toes of the wearer.

Other features of my invention are hereinafter pointed out.

In the accompanying drawing:

Figure 2 is a plan view of the sheet metal toe box forming part of the shoe shown in Figure 1.

Figure 1:
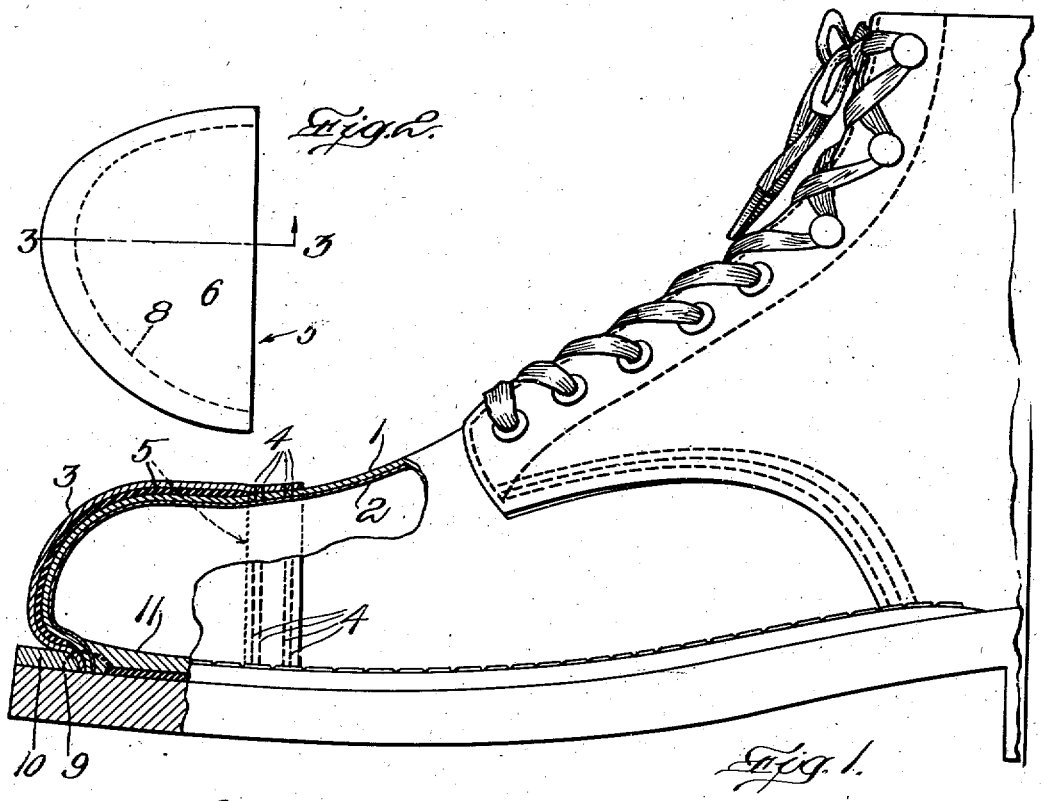
Figure 1 is a side elevation of a portion of a workman's shoe constructed in accordance with my invention.

Having reference to the drawing 1 is the vamp of the upper of a workman's shoe within which is provided the usual lining 2. At 3 is the usual toe cap whose rear marginal portion is fitted against the outside of the upper leather 1 and fastened to the latter by several lines of stitches 4.

Figure 3:
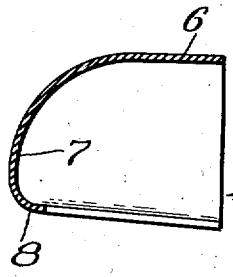
Figure 3 is a section on line 3—3 of Figure 2.

The stitches 4, just referred to, also assist in holding a sheet metal toe box 5 in position between the upper leather 1 and the leather toe cap 3. This toe box 5 is preferably made from comparatively heavy gauge sheet steel which is hardened and tempered so that it will strongly resist any pressures tending to crush or distort the same. Also said metal box is made toe-shaped as shown in Figs. 2 and 3, being formed with a top wall 6 and a skirt 7 which extends from one side of the box around the front thereof to the rear of the box at the opposite side thereof. As shown clearly in the drawing the lower marginal portion 8 of the toe box 5 is set inwardly but terminates outside of the inseam stitches 9, Fig. 1, by which the welt 10, leather toe cap 3, upper 1 and lining 2 are fastened to the innersole 11 of the shoe.

Thus the metal toe box 5 is completely embedded within the upper of the shoe and is pocketed between the stitches 9 and 4 so that it is held against displacement within its pocket.

A toe box 5 made as above described will withstand great blows and pressures but it is possible, of course, that a weight may fall upon the foot of the wearer of the shoe with enough force either to crush the toe box 5 or to drive it downwardly into the foot of the wearer. In such an event the toe cap would, or would tend to lock the foot of the wearer within the shoe but it is a distinct advantage to the above described structure that the foot can, under such circumstances, be quickly freed from the shoe by drawing a knife blade horizontally around the leather toe cap 3 near the base of the latter, thereby permitting said leather toe cap to be raised so that the metal box 5 is easily removable.

Figure 4:
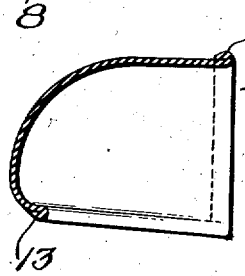
Figure 4 is a view like Figure 3 but showing another form of sheet metal toe box.

The form of sheet metal toe box shown in Fig. 4 has its bottom and rear edges thickened and made blunt by upsetting the marginal portions thereof as shown at 12 and 13. This form of toe box has the advantage that its edges are not so sharp as the edges of the box shown in Fig. 3 so that there is less likelihood of said edges cutting through the leather or other parts of the shoe when a heavy downward and inward pressure is exerted upon the box by a falling weight or the like than is the case with the form shown in Fig. 3.

It is a feature of both forms of metal box herein described that the bottom marginal portion of each is turned inwardly as shown for example so that this portion seats flatwise upon the portion of the shoe directly beneath it and by which it is supported against downward thrust. Furthermore, the inturned marginal portion is received within a natural pocket formed by the line of inseam stitches within and below the outer edge of the insole, measurably aiding in the retention of the metal box against displacement within the pocket and causing pressure upon the box to be transmitted to the underlying welt and outsole without tendency to cut or injure the latter.

What is claimed is:

1. A boot or shoe of the character described comprising a sole, an upper having two complete toe portions, one portion being in the nature of an exterior toe cap, means for fastening the two portions together by a seam extending transversely of the upper, means fastening the lower marginal portions of said toe cap and of said upper to the sole, and a rigid metal toe box wholly disposed between said two fastening means and between said toe cap and said toe portion of the upper to protect the toes of the wearer, the metal box having an inwardly turned portion shaped to form a seat extending thereabout and supporting the box against downward thrust.

2. A boot or shoe of the character described comprising a shoe upper and insole, a toe cap surrounding the upper at the toe portion, a line of stitches connecting the rear portion of the toe cap and upper, a welt, a line of stitches connecting the welt, upper, toe cap and insole, a rigid metal box inserted between the upper and toe cap and lying between the stitched seams, and an outsole connected to the shoe and covering the inseam.

3. A boot or shoe of the character described comprising a shoe upper and insole, a toe cap surrounding the upper at the toe portion, a line of stitches connecting the rear portion of the toe cap and upper, a welt, a line of stitches connecting the welt, upper, toe cap and insole, a rigid metal box inserted between the upper and the toe cap and lying between the stitched seams, having an inturned lower portion to afford a seat for the box through which pressure is transmitted to the inturned toe cap and supporting welt therebeneath, and an outsole connected to the shoe and covering the inseam.

4. A boot or shoe comprising an insole and an outsole, a rigid metal box having an inturned bottom marginal portion extending thereabout, oppositely disposed layers of upper material encompassing the toe box, means for connecting the under side of the insole and layers of upper material beyond the inturned edge of the toe box with the inturned flange of the latter lying within the natural inturned pocket formed in the layers of upper material through the connection between the insole and upper to maintain the toe box against displacement throughout its lower edge, and an outsole connected to the shoe and covering the inseam.

5. A boot or shoe comprising an insole, a welt, a rigid metal box having an inturned marginal flange extending thereabout at the bottom, oppositely disposed layers of upper material enclosing the toe box and extending beyond the lower edge of the box, an inseam for connecting the welt, the under portion of the insole and layers of upper material beyond the inturned edge of the toe box, the portion of the upper material joined by the inseam lying within and below the outer margin of the insole to provide a natural inturned pocket in the upper material within which the inturned flange of the toe box lies to prevent displacement of any portion of the toe box throughout its lower edge, and an outsole connected to the shoe and covering the inseam.

6. A boot or shoe of the character described comprising an insole, a welt, a rigid metal toe box, oppositely disposed layers of upper material encompassing the toe box and extending beyond the lower edge of the toe box, a line of inseam stitches connecting the welt, insole and layers of upper material beyond the lower edge of the toe box, and an outsole connected to the shoe and covering the inseam.

7. A boot or shoe of the character described comprising an insole and an outsole, a rigid metal box having an inturned bottom marginal portion extending substantially completely thereabout to provide a supporting flange for the box when crushing pressure is exerted thereon, the flange being comparatively narrow with respect to the dimensions of the box and of insufficient width to encase the toes of the wearer therein, oppositely disposed layers of material encompassing the toe box, means for connecting the insole and layers of material beyond the inturned edge of the toe box to provide a pocket from which the box may be readily removed by severing the outer layer of material, and an outsole connected to the shoe and covering the inseam.

ARTHUR A. WILLIAMS.